(No Model.)   3 Sheets—Sheet 1.

J. C. BARLOW.
CORN PLANTER.

No. 378,279.   Patented Feb. 21, 1888.

Witnesses:
Chas. R. Burr.
Thomas Durant.

Inventor:
Joseph C. Barlow
by Church & Church
his Attorneys.

(No Model.) 3 Sheets—Sheet 2.

J. C. BARLOW.
CORN PLANTER.

No. 378,279. Patented Feb. 21, 1888.

Witnesses.
Chas. R. Burr.
A. J. Stewart.

Inventor.
Joseph C. Barlow,
by Church & Church
his Attorneys.

(No Model.) 3 Sheets—Sheet 3.
J. C. BARLOW.
CORN PLANTER.
No. 378,279. Patented Feb. 21, 1888.
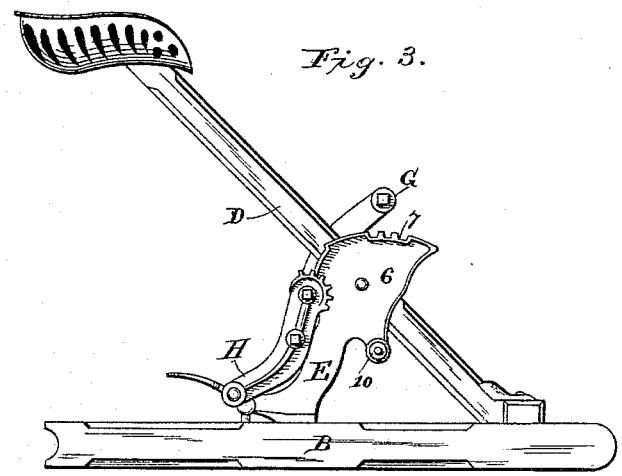
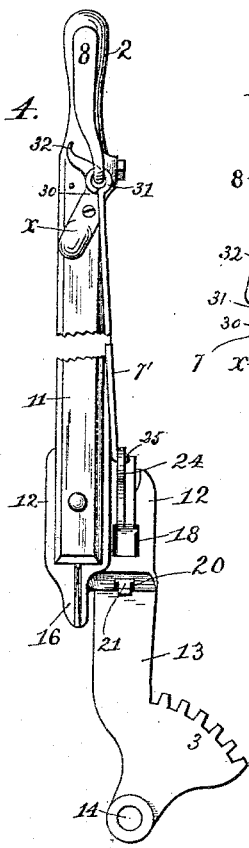
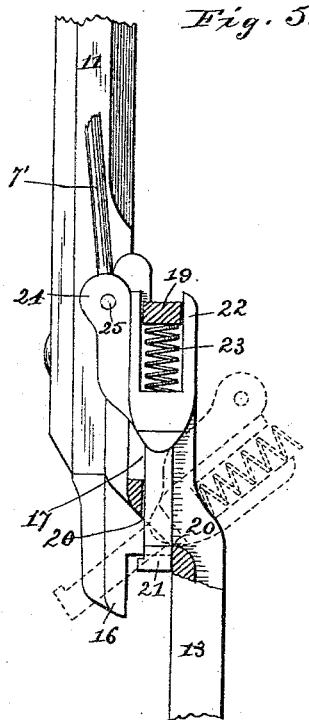
Witnesses.
Chas. R. Burr.
A. J. Stewart.
Inventor.
Joseph C. Barlow,
by Church & Church
his Attorneys.

UNITED STATES PATENT OFFICE.

JOSEPH C. BARLOW, OF QUINCY, ILLINOIS.

CORN-PLANTER.

SPECIFICATION forming part of Letters Patent No. 378,279, dated February 21, 1888.

Application filed November 16, 1887. Serial No. 255,339. (No model.)

*To all whom it may concern:*

Be it known that I, JOSEPH C. BARLOW, of Quincy, in the county of Adams and State of Illinois, have invented certain new and useful Improvements in Corn-Planters; and I do hereby declare the following to be a full, clear, and exact description of the same, reference being had to the accompanying drawings, forming a part of this specification, and to the figures and letters of reference marked thereon.

This invention relates to improvements in adjusting and holding mechanism such as is employed in agricultural implements for shifting the position of the working parts, and is more especially designed as an improvement upon and applicable to the mechanism patented to me April 27, 1875, No. 162,599.

The principal object had in view is to simplify and at the same time increase the effectiveness of the operating devices by the employment, in connection with and as supplemental to the foot-levers which operate upon the parts to be raised or lowered or adjusted relative to other parts or the ground, of a hand-lever so connected and applied as to afford a ready and convenient means of applying additional power to quickly shift or adjust the mechanism and to lock and hold the parts in the desired position, all as hereinafter more fully described, and pointed out in the following specification and claims.

Figure 1:
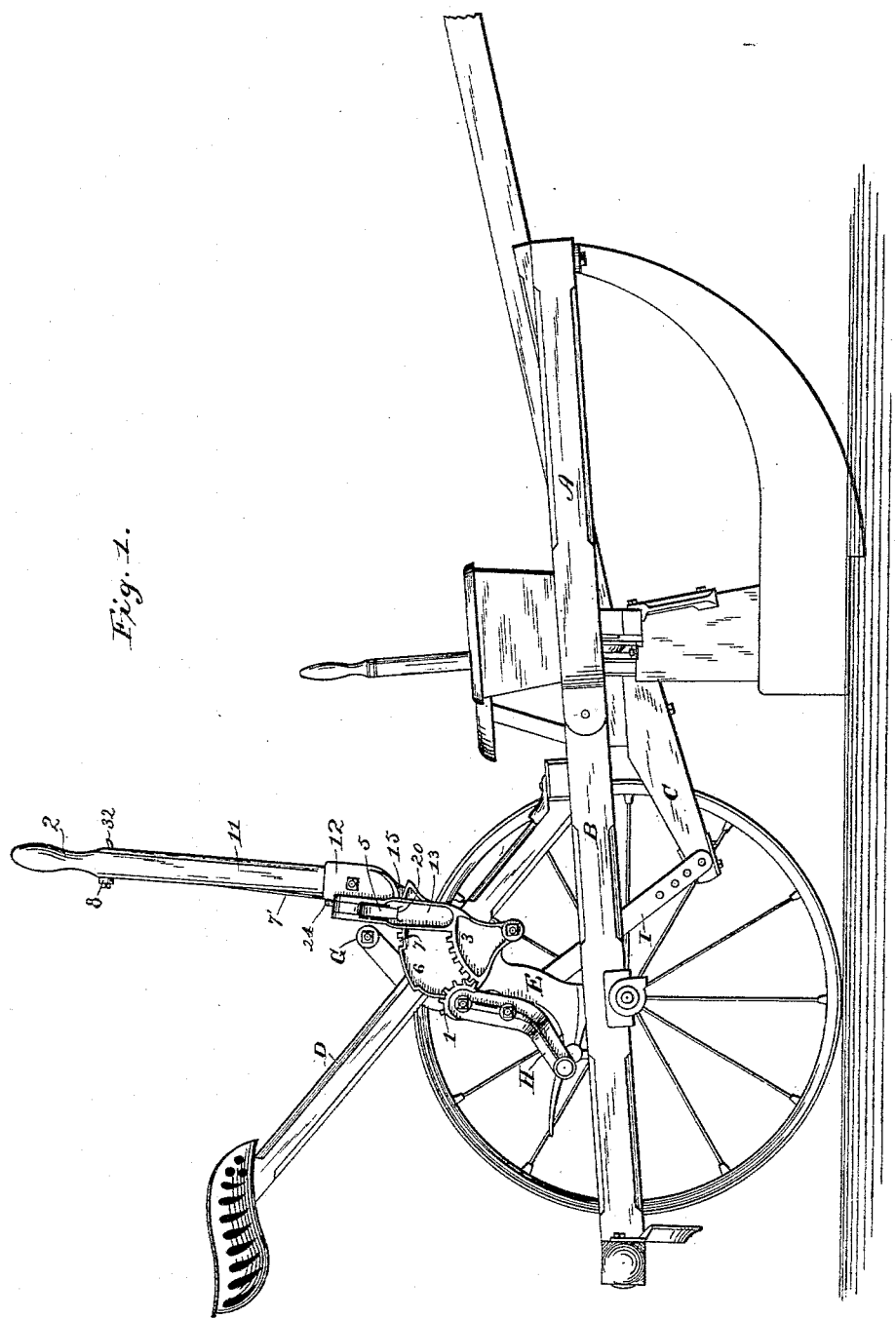
Figure 2:
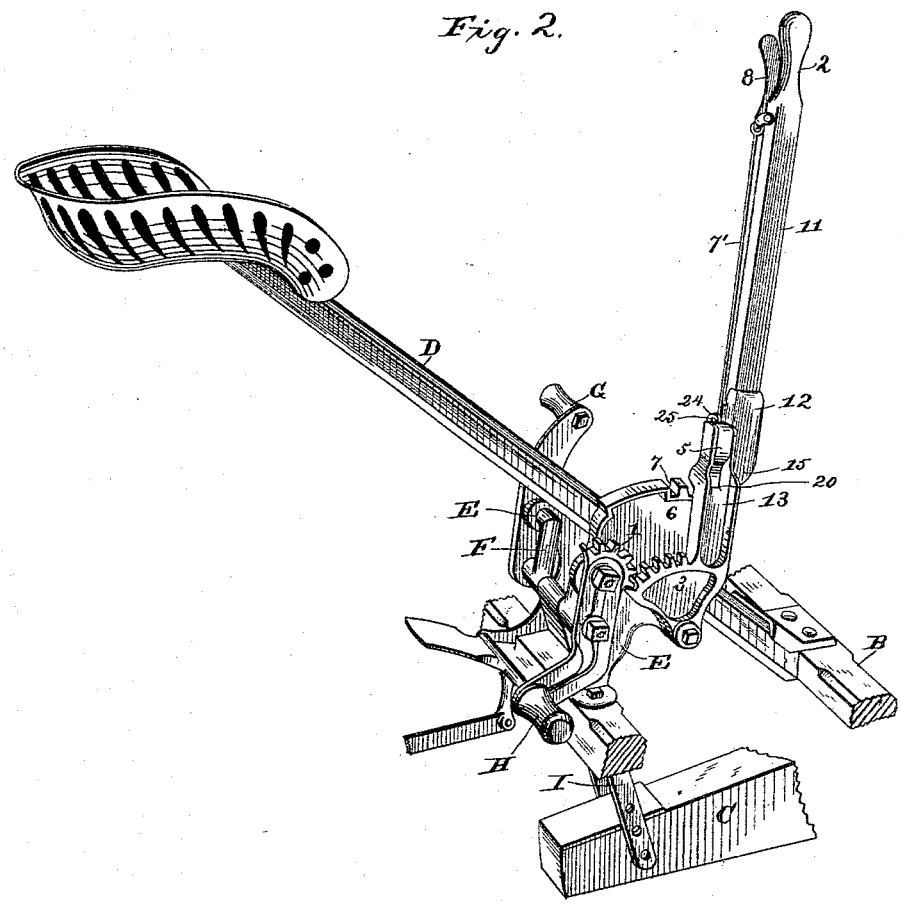

In the accompanying drawings, illustrating one application or adaptation of my said invention, Figure 1 is a side elevation of a portion of a planter, showing the main and runner frames, the near supporting-wheel being removed and the runners depressed. Fig. 2 is an enlarged view in perspective showing the adjusting devices and supporting-frame combined. Fig. 3 is a side elevation of the adjusting devices with the hand-lever mechanism removed. Fig. 4 is a side elevation of the hand-lever detached. Fig. 5 is a detail illustrating the application of the locking dog or pawl in its supporting frame or socket. Fig. 6 is a front view of the hand-lever, showing the devices for holding the locking-dog retracted.

Similar letters of reference in the several figures indicate the same parts.

The letter A designates the runner-frame, and B the main frame, the latter being supported on wheels and hinged or otherwise pivotally connected to the runner-frame A.

C represents the rear extension of the tongue, or a lever secured to the runner-frame, by which the latter is elevated or depressed in the usual and well-understood manner.

D represents the seat-standard, E the side plates or frames of the adjusting mechanisms, F the crank supported in the side plates, E, and provided with the foot-levers G and H, and I the link or rod connecting the lever C and crank F, these parts being arranged and combined for conjoint action substantially as described in my before-mentioned patent— that is to say, as pressure is applied to one or the other of the foot-levers the runner-frame will be elevated or depressed.

The levers G and H are preferably so disposed relatively to the crank, pitman, and position of the operator that the maximum power or leverage will be developed when the runners are depressed—that is to say, when forced into the soil in working position; but as the levers are securely fastened to and vibrate in unison with the crank through which the movement of the runner-frame is produced, it follows that at some point in the movement—in the present instance when the runner-frame is elevated—the lever will occupy a position more nearly in line with the pivots of the crank, and in proportion as they approach said line the power exerted by the operator upon the runner-frame will be diminished.

A much greater degree of pressure is required to force and hold the runners in working position in the ground than to hold them elevated above the surface, and for this reason the foot-levers are preferably so arranged and disposed that they will exert the maximum effect upon the crank when the runners are depressed; but even with such an arrangement considerable power has to be exerted to force the runners into the ground, and it is found almost impossible to retain the runners in adjusted position by means of the foot-lever alone. Moreover, relatively longer foot-levers (or, what amounts to the same thing, a shorter crank) have to be employed in order that the machine may be used in soils varying in density and hardness. These objections have been in a measure overcome and the deficiencies supplied by the addition of a hand-lever and locking mechanism, as described in Patent No. 329,994, granted to me November 10, 1885. In said last-mentioned patented improvement the hand-lever was so arranged and applied that it could be detached from the locking-plate, and, when desired, engaged with the foot lever or crank and be used to supplement the pressure of the foot-lever in adjusting the position of the runner-frame. In this case the hand-lever served principally to assist in forcing the runners into the ground; hence it was applied to that side of the crank or adjusting mechanism in front of or above the point to which the pitman was attached, so that by drawing the lever back or toward the operator the runners would be depressed. This necessitated the mounting of the hand-lever on the left of the operator or driver, the crank being located in rear of the seat-standard, and as the locking mechanism was only brought into action when the lever was drawn back, if said lever was employed to assist in raising the runners it had to be disengaged from the actuating devices and shifted to a new position before the lock for holding the frame elevated could be applied.

Now, according to the scheme of my present invention, the hand-lever is applied on the right of the operator, and is so connected and arranged that it is always in position for use to assist in raising and lowering the runner-frame, and at the same time the locking mechanism will operate to hold the crank or operating devices at any desired point of adjustment. To accomplish these and other desirable additions and improvements to my said patented mechanisms, I attach to or form upon the foot-lever H a geared segment, 1, and furnish the hand-lever 2 with a geared segment, 3, co-operating with segment 1. These geared segments are preferably so arranged and applied that when the foot-levers are actuated in a direction to cause the runners to penetrate the earth the hand-lever will be moved forward or from the driver, the reverse of that shown in my Patent No. 329,994, and, unlike the said patented device, the lever may be grasped by either the right or left hand, instead of the left hand only, and is at all times connected to and moves with the crank; hence it is always ready for use without further adjustment, and can be employed either alone or in connection with the foot-levers to either depress or elevate the runners—a feature of no small importance, as by the use of the hand-lever the adjustments can be more quickly effected. The hand-lever is pivotally supported upon the side plate or bracket, E, and carries a dog, 5, co-operating with a stationary plate, 6, whereby the adjusting mechanism may be locked and held in any desired position. In the present instance the said plate 6 is formed upon or constitutes a part of the side plate or bracket, E, its upper edge being formed in the arc of a circle and provided with a series of notches, 7, for the reception of the end of the holding-dog 5, which latter is connected, by a rod, 7', or equivalent device, with a lever, 8, mounted on the lever 2 in position to be operated by the hand with which the lever is operated, said lever 8 serving to withdraw the dog from engagement with plate 6 to release the adjusting mechanism.

As is obvious, the several co-operating devices referred to may be made and combined in a variety of forms; hence I do not wish to be understood as restricting my invention to the special features of construction hereinafter described, except in those particulars specified in the claims.

It is desirable in all implements of the class to which my present invention relates that the operating parts should be specially designed and adapted to withstand the wear and rough usage to which they are subjected, without liability of breaking or becoming disarranged or the parts displaced. To this end I construct and apply the locking and hand actuating devices as follows: The side plate or frame, E, which is enlarged to form the locking-plate 6, has cast integral therewith a stud or bearing, 10, constituting the pivot or fulcrum of the hand-lever.

The hand-lever proper is composed of a wooden piece, 11, whose lower end rests in a socket, 12, in a metal frame or plate, 13, to which latter it is securely fastened by a bolt or screw. The frame 13, to which the handle 11 is secured, is provided with or carries the gear-segment 3, a socket or bearing, 14, fitting the stud 10, a web or bar, 15, connecting the gear-segment with the handle-socket, a lug or dependent web, 16, adjacent the bar 15, but separated therefrom by a space a little wider than the thickness of plate 6, and a socket, 17, provided with a transverse slot, 18, cross piece or guide 19, and notch or opening 20.

The several parts referred to as constituting the frame 13 are preferably cast in one piece.

The locking-dog 5 is provided at one end with a square or other shaped bolt, 21, passing through the opening 20 in socket 17 and projecting in line with the notches in plate 6, and a furcated rear end, 22, fitting between the sides of slot 18 and embracing the cross-piece 19, between which latter and the bolt 21 a spring, 23, is located. On the side of the dog is formed an ear, 24, for the bent end 25 of rod 7', the upper end of said rod being attached to the trip-lever 8.

The several parts, being constructed as described, are combined and connected as follows: The slot 18 in socket 17 is longer on the side opposite ear 24, and the dog 5 is inserted from that side by first slipping the bolt 21 into socket 17 and then sliding the furcated end 22 into slot 18 until its two arms stand in line with the opposite faces of cross-piece 19, as shown in dotted lines in Fig. 5. The spring previously inserted in the furcated end of the dog now rests against the cross-piece and serves to press the dog forward. The hooked end of the rod 7' being now inserted in the ear 24 from the side next the handle—that is to say, beneath the ear—prevents the dog from swinging back and slipping out of the socket, so that until the rod 7' is disconnected the dog cannot escape or be moved or displaced. The arc-shaped edge of the plate 6, in which the locking-notches are formed, exceeds in length the maximum throw of that portion of the plate 13 to which the locking-dog and lug 16 are secured, said lug 16 serving as a guide or stop to prevent lateral displacement of the plate 13 and its attached hand-lever.

The hand-lever vibrates in unison with the other adjusting devices, to which it is connected through the gear-segments, and the plate 6 being longer than the movement permitted the lug 16, it follows that when the parts are connected in operative position the said lug will at all times overlap the edge of plate 6; hence, in order to apply or remove the plate 13, it is necessary to first disengage or disconnect some part of the operating mechanism to permit the independent movement of the said plate 13. This may be accomplished, and with the devices shown can only be accomplished, by the removal of the foot-lever H and its gear-segment 1, thereby releasing the plate 13, so that the lug can be swung clear of the plate 6. Thus, when the plate 13 is secured in place and the foot-lever fastened to the crank, the hand-lever and its plate 13 will be retained and held in operative position relative to the other actuating devices and the locking-plate, and there will be no danger or liability of the said plate becoming displaced or thrown out of gear. The dog 5, when in position, is at all times held partially retracted by the locking-plate, so that its furcated end embraces the cross-bar 19, and is thereby guided and prevented from lateral displacement.

In order that the dog 5 may be held or locked in retracted position, if desired, as when actuating the devices by means of the foot-levers alone, a pawl or locking-dog, x, is pivotally mounted upon the hand-lever in position to engage and hold the lever 8 when the dog 5 has been retracted thereby, said dog x being provided with means for withdrawing it from engagement with and holding it retracted when it becomes necessary or desirable to throw the dog 5 into action.

A device of this character is illustrated, and consists of a pivoted lever, 30, having a shoulder, 31, for passing under an arm of lever 8 to hold said lever retracted, and a thumb-piece or handle, 32, for operating said lever 30. The material of the lever is so arranged and disposed relative to its point of suspension or pivot that the lever will normally be held out of contact with lever 8 and against a pin or stop, 25; but when said lever is pressed under or into engagement with the lever 8 the pressure of the spring on the locking-dog 5 will serve to retain it in position, so that by a slight movement of the lever 8, as in grasping the hand-lever, the dog x will be permitted to fall back or out of the way, leaving the lever 8 free to oscillate and allowing the dog 5 to engage the notches in plate 6 when the pressure of the hand is removed from said lever 8.

Having thus described my invention, what I claim as new is—

1. In a corn-planter and similar implements, the combination, with the foot-lever, of the adjusting mechanism, a toothed segment connected to said foot-lever, and a hand-lever provided with a toothed segment gearing into the segment on the foot-lever and located on the right-hand side of the operator, substantially as described.

2. In a corn-planter, the combination, with the operating-crank and attached foot-levers supported beneath or in rear of the seat-standard, of a hand-lever pivotally supported on the frame and connected to the crank through geared segments, substantially as described.

3. In a corn-planter, and in combination with the foot-levers and the gear-segment secured thereto, the hand-lever provided with gear-segment and a locking device, substantially as described.

4. In a corn-planter, and in combination with the hand-lever connected to the runner-actuating devices through gear-segments, as described, the locking-dog and a detent for holding said dog retracted, as and for the purpose set forth.

5. In a corn-planter such as described, the combination, with the actuating-crank and foot-levers, one of the latter being provided with a gear-segment, of the stationary segmental plate and the hand-lever provided with gear-segment and a dependent lug for engaging said plate to retain the lever in position, substantially as described.

6. In a corn-planter such as described, the combination, with the detachable foot-lever provided with a gear-segment and the frame with its segmental locking-plate, of the hand-lever provided with a gear-segment, a lug and dog engaging said segmental plate, substantially as and for the purpose set forth.

7. In a corn-planter such as described, and as a means for locating and retaining the locking-dog in position, the socket 17, formed with an opening, 20, for the bolt, a transverse slot, 18, and a cross-piece, 19, and the dog 5, formed with an engaging bolt and furcated end, constructed and applied substantially as described.

8. In a corn-planter such as described, and in combination with the operating hand-lever provided with a socket, 17, such as described, and a lug or shoulder, 16, co-operating with the notched plate for retaining said lever in working position, a dog, 5, inserted in a socket in said hand-lever and held in position by engagement with the notched plate, substantially as described.

9. In a corn-planter such as described, and in combination with the hand-lever connected to the crank and foot levers by gear-segments, a locking mechanism consisting, essentially, of a notched plate and movable dog, a lever connected to said dog, and a second pivoted dog supported in position to engage said lever to hold it retracted, substantially as described.

10. In combination with the hand-lever connected to the actuating devices and the locking-dog carried thereby, the lever connected to said dog, and the pivoted and weighted dog provided with a shoulder for co-operating with said last-mentioned lever to hold it partially retracted, substantially as described.

11. In a corn-planter, the combination, with the movable runner-frame and adjusting devices, of the rearwardly-projecting foot-lever H, provided with a gear-segment, and a hand-lever pivotally supported upon the frame in position to engage the segment on lever H, substantially as described.

JOSEPH C. BARLOW.

Witnesses:
L. E. EMMONS,
L. B. BOSWELL.